(12) United States Patent
Korevaar

(10) Patent No.: US 6,498,668 B1
(45) Date of Patent: Dec. 24, 2002

(54) ALIGNMENT SYSTEM FOR LASER COMMUNICATION BEAM

(75) Inventor: Eric Korevaar, San Diego, CA (US)

(73) Assignee: Astroterra Corporation, San Diego, CA (US)

(*) Notice: Subject to any disclaimer, the term of this patent is extended or adjusted under 35 U.S.C. 154(b) by 0 days.

(21) Appl. No.: 09/266,457

(22) Filed: Mar. 11, 1999

(51) Int. Cl.[7] .......................... H04B 10/10; H04B 10/24
(52) U.S. Cl. ...................... 359/159; 359/172; 359/173
(58) Field of Search ................................ 359/159–193

(56) References Cited

U.S. PATENT DOCUMENTS

| | | | |
|---|---|---|---|
| 3,488,586 A | | 1/1970 | Watrous et al. |
| 3,794,841 A | | 2/1974 | Cosentino et al. |
| 4,630,254 A | | 12/1986 | Tseng |
| 5,416,627 A | | 5/1995 | Wilmoth |
| 5,777,768 A | | 7/1998 | Korevaar |
| 5,867,294 A | * | 2/1999 | Sakai ........................ 359/159 |
| 6,031,648 A | * | 2/2000 | Javitt et al. ................ 359/124 |
| 6,097,522 A | * | 8/2000 | Maerki et al. ............. 359/159 |
| 6,178,024 B1 | * | 1/2001 | Degura ....................... 359/115 |
| 6,323,980 B1 | * | 11/2001 | Bloom ........................ 359/154 |

OTHER PUBLICATIONS

W.M. Bruno, R. Mangual, and R.F. Zampolin, *Diode Laser Spatial Diversity Transmitter*, pp. 187–194, SPIE vol. 1044 Optomechanical Design of Laser Transmitter and Receivers, (1989).

E. Korevaar et al., *Status of SDIO/IS&T Lasercom Testbed Program*, pp. 116–127, SPIE vol. 1866, Jan. 1993.

E. Korevaar et al., *Status of BMDO/IST Lasercom Advanced Technology Demonstration*, pp. 96–107, SPIE vol. 2123, Jun. 1994.

E. Korevaar et al., *Design of Satellite Terminal for BMDO Lasercom Technology Demonstration*, pp. 60–71, SPIE vol. 2381, Sep. 1995.

J. Schuster et al., *Optomechanical Design of STRV–2 Lasercom Transceiver Using Novel Azimuth/Slant Gimbal*, pp. 227–239, SPIE vol. 2699, Jan. 1996.

K.E. Wilson et al., *Preliminary Results of the Ground/Orbiter Lasercomm Demonstration Experiment between Table Mountain and the ETS–VI Satellite*, pp. 121–132, SPIE vol. 2699, May 1996.

Copy of brochure on Terralink™ Laser Communications Systems; Transceiver Specifications; AstroTerra Corporation; 11526 Sorrento Valley Rd., Suite V, San Diego, CA 92121.

* cited by examiner

*Primary Examiner*—Leslie Pascal
(74) *Attorney, Agent, or Firm*—Nydegger & Associates

(57) ABSTRACT

A system for directing a communication beam from a transmitter at a first location onto an optical target of a receiver at a second location uses a terrestrial free-space optical data link. The system includes an optical fiber which emanates the communication beam at a first wavelength in the intermediate infrared range onto an optical element of the transmitter. The optical element then collimates and directs the communication beam, together with a beacon beam of a second wavelength in the near infrared range, in a common beam along a path toward the receiver. At the second location, the receiver collects the common beam and focuses it to a focal point. A camera in the receiver then receives scattered light of the beacon beam from the focal point to determine a displacement distance between the focal point and the target. The focal point and target are then aligned with each other to reduce the displacement distance to a null and thereby make the focal point of the common beam incident on the target. Accordingly, the communication beam is directed onto the target which may either be an optical detector or another optical fiber.

20 Claims, 3 Drawing Sheets

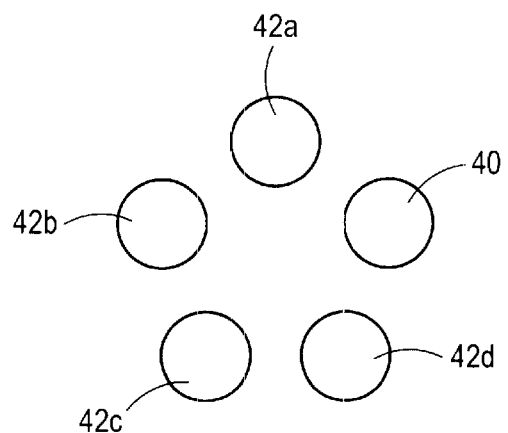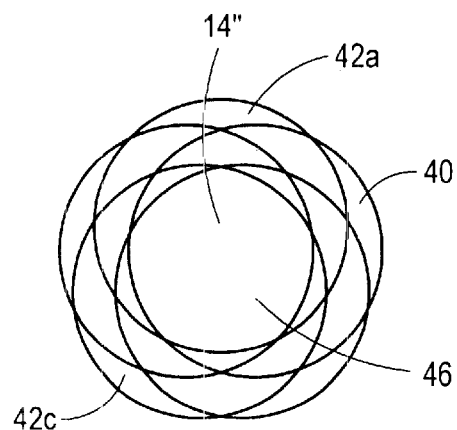
Fig. 4A        Fig. 4B
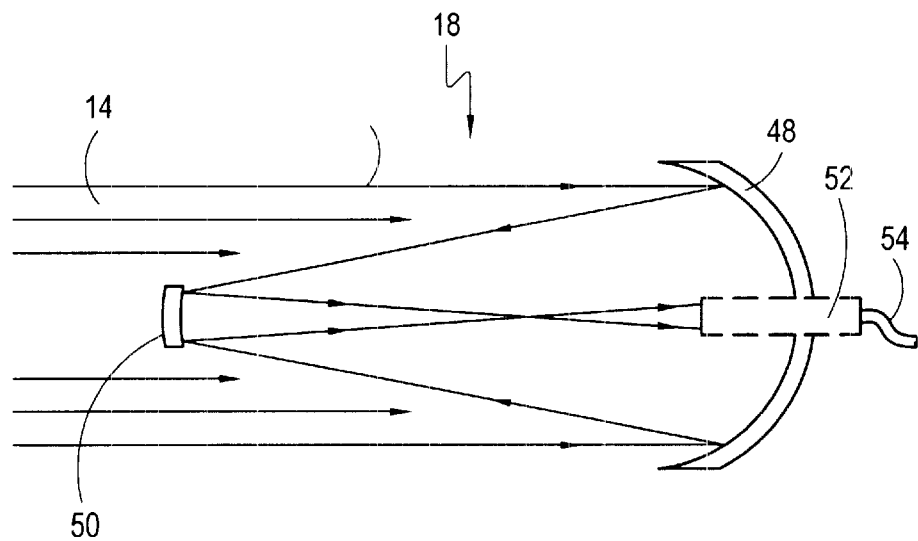
Fig. 5

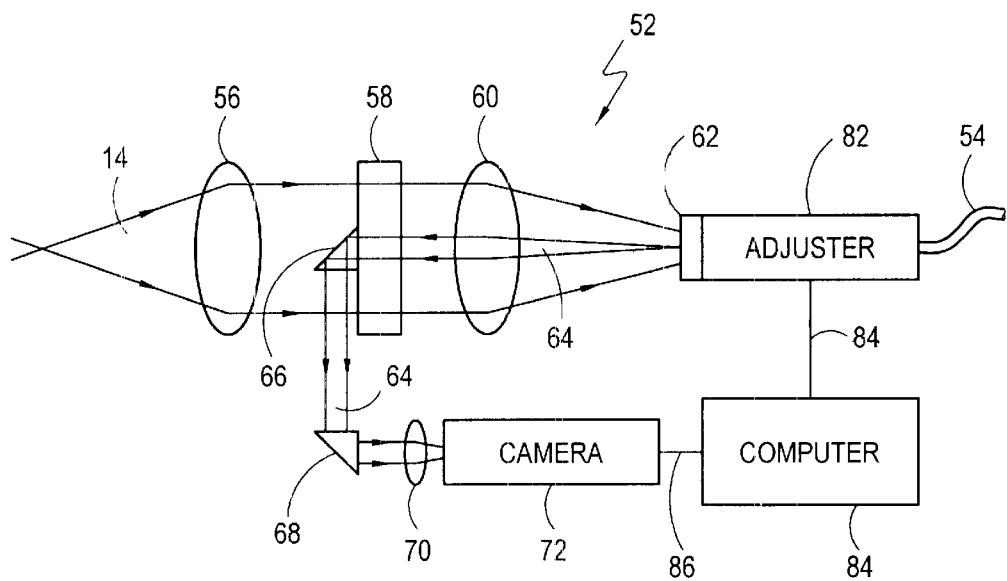
Fig. 6
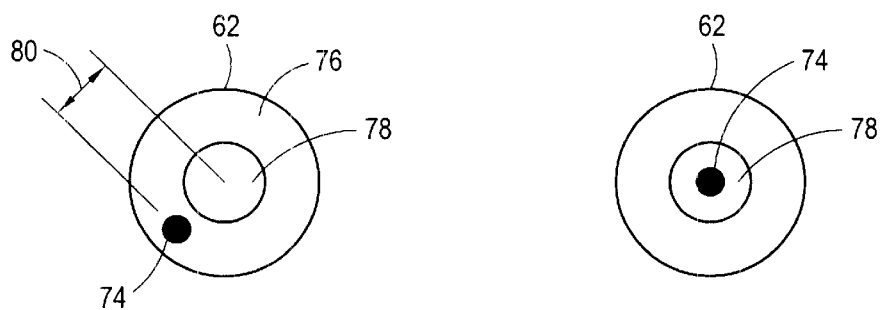
Fig. 7A                    Fig. 7B

ALIGNMENT SYSTEM FOR LASER COMMUNICATION BEAM

FIELD OF THE INVENTION

The present invention pertains generally to communication data links. More particularly, the present invention pertains to transceivers which are useful in terrestrial free-space optical data links. The present invention is particularly, but not exclusively, useful as a method, or a system, for optically aligning a transceiver at a first location with a transceiver at a second location.

BACKGROUND OF THE INVENTION

A basic requirement in all modern day societies, in both the government and private sectors, is the ability to effectively and accurately communicate between two or more locations. As is well known, such communication can be accomplished in any of several different ways. For example, wire communications such as a telephone exchange, may be either automatic or manual. The common characteristic of wire communication systems, however, is that they have a continuous connection through a system. On the other hand, wireless communications systems, such as radio, have no connecting wires and, instead, involve methods of signaling through space by means of electromagnetic waves. Not surprisingly, communication systems which incorporate interconnecting links of wire and wireless components have also been used.

In recent years, optics have been used in an ever-increasing number of applications for both wire and wireless type links in communication systems. One particularly popular component which is used as a wire link in an optical communications system is the optical fiber. In general, an optical fiber is made of ultra-pure glass and has a central core having a higher refractive-index glass than its outer cladding. Importantly, with this construction an optical fiber is capable of conducting modulated light signals by total internal reflection. Depending on the particular application, an optical fiber may be either a single mode fiber or a multi-mode fiber. More specifically, for a single mode fiber, the diameter of the inner core is comparable with the wavelength of the transmitted light. Thus, there is only one mode of light propagation through the fiber, and distortion is minimized or eliminated. In comparison, a multi-mode optical fiber has a core diameter which is sufficiently larger than the wavelength of the transmitted light. This allows propagation of the light energy in a large number of different modes. Typically, multi-mode optical fibers are used as wire links for data networks which are located inside of buildings where high loss, and therefore short distances, can be tolerated. Further, multi-mode optical fibers are relatively inexpensive and are easier to couple into and out of with other network components than are single mode fibers. High speed telecommunications, however, often require the use of single mode optical fibers which have less loss and which are useable over longer distances than are the multi-mode optical fibers. The single mode fibers, however, are relatively more expensive and are harder to couple into and out of with other network components. Thus, the trade-offs can be significant.

Regardless of whether a single mode or a multi-mode optical fiber is used, in all instances the benefits of using an optical fiber include small diameters, high potential bandwidth and lower costs. Further, optical fibers can be used either alone, or they can be bundled into cables. In certain respects, however, an optical fiber communications system suffers the same shortcomings as any other wire system. Namely; not all communications systems are able to effectively and efficiently incorporate optical fibers throughout the entire system. Indeed, optical communications links across free-space may be necessary and desired.

The question of incorporating a terrestrial free-space optical data link for use with an optical fiber system raises several interesting issues. These include: the possible need for amplification of the optical signal before its transmission from the optical fiber across the free-space; the need to maintain the integrity of the optical signal during its transmission across the free-space; and, the detection, alignment, and focusing of the optical signal after it has been transmitted across the free-space. As implied above, the use of optical fibers in a communication system means that the communication beam will have an extremely small diameter. Multi-mode optical fibers, for instance, can have core diameters as small as about fifty microns. Single mode fibers are even smaller, and can have core diameters of only around ten microns. The ability to focus light into such a small diameter after propagation through free space in a manner which will allow for effective transmission of the data carried on the beam is of no small concern. The problems are further complicated by the fact that effective wavelengths for communication beams are longer than the wavelength of visible light and, therefore, require expensive, specialized equipment for their detection. Additionally, the use of longer wavelengths for the communication beam is preferable due to the fact that amplification of the light beam is more easily accomplished at such wavelengths.

In light of the above it is an object of the present invention to provide a method and a system which are capable of continuing the high speed telecommunications data transmitting capacity of an optical fiber over a terrestrial free-space optical data link. Another object of the present invention is to provide a system and a method which will interconnect an optical fiber with other optical elements for the uninterrupted transmission of a communication beam between the optical fiber and another medium, such as the earth's atmosphere. Still another object of the present invention is to provide a system and a method which will align a communication beam with an optical target, such as an optical fiber or an optical detector, wherein the target has a reception area that is less than approximately two hundred microns in diameter. Yet another object of the present invention is to provide a system and a method for directing a communication beam over a terrestrial free-space optical data link which is easy to manufacture, relatively simple to use, and comparatively cost effective.

SUMMARY OF THE PREFERRED EMBODIMENTS

In accordance with the present invention, a system for directing a communication beam from a first location through a transit distance to a second location over a terrestrial free-space optical data link includes an optical fiber which emanates the communication beam at the first location. Preferably the wavelength of the communication beam is in the intermediate infrared, and is approximately 1550 nm, so that it may be amplified by an erbium doped optical amplifier before being transmitted over the data link.

A transmitter is positioned at the first location and is optically connected with the optical fiber. Specifically, the transmitter includes an optical element for collimating and directing the communication beam along a path toward a target at the second location. Additionally, the transmitter at the first location includes a laser diode for generating a beacon beam which is also optically connected with the optical element of the transmitter. The optical element of the transmitter thus collimates and directs both the beacon beam and the communication beam along the path as a combined common beam. In one embodiment of the present invention a coupler is used to couple the beacon beam directly with the communication beam in the optical fiber before the two beams emanate from the optical fiber. In another embodiment, the transmitter transmits the communication beam along a first path while it transmits the beacon beam along a second path. For this embodiment, the second path is substantially parallel to the first path so that there is an overlap region which is established beyond an overlap distance from the transmitter. Once the beams overlap beyond the overlap distance, a portion of the communication beam and a portion of the beacon beam will then travel further on the path as the common beam. Importantly, for either embodiment, both the communication beam of one wavelength and the beacon beam of another wavelength are combined into a common beam before the common beam arrives at the second location.

At the second location there is a receiver which is positioned to collect the common beam and to then focus the common beam to a focal point on an optical target. Included in the receiver at the second location is a camera which receives scattered light from the optical target which will include an image of the focal point. By detecting this scattered light, the camera is able to locate the focal point. For the present invention the camera can be a CCD type camera, a CMOS type camera, or any other similar type camera which will detect visible or near infrared light from the beacon beam. Preferably, the camera is relatively inexpensive.

As used in the present invention, based on the known location of an optical target on the detector in the receiver, and the detected location of the focal point of the received common beam, the camera determines any displacement distance which may exist between the focal point of the common beam and the optical target. As contemplated for the present invention, the optical target can be the core of a single mode optical fiber wherein the core has a diameter of approximately ten microns (10 $\mu$m). Alternatively, the target can be part of a larger optical detector or multi-mode fiber having a diameter in a range of approximately thirty to seventy microns (30–70 $\mu$m). In either case, the objective of the present invention is to then reduce the displacement distance between the focal point of the common beam and the optical target to a null. In effect this will make the focal point of the common beam incident on the optical target.

In order to align the focal point of the common beam with the optical target, an adjuster is used which will move the focal point relative to the target. For one embodiment of the present invention, the adjuster can be a mechanical linkage which is manually operable to position the focal point of the common beam on the target. For another embodiment of the present invention, the alignment of the focal point with the optical target can be accomplished using a computer. If used, the computer will be programmed to receive input from the camera and to generate an error signal that is indicative of the displacement distance between the focal point of the common beam and the target. Further, the computer will also include electronics for activating the adjuster to reduce the error signal to a null. The computer can be used thereafter to substantially maintain the error signal at the null.

It is contemplated that the data communication link which is established by the present invention may be either a one-way communication link, such as described above, or a two-way communication link. For the latter case, the system can include a first base on which are mounted: a transmitter, a beacon beam generating laser diode, a receiver, a camera and an adjuster with or without an associated computer. This first base can then be positioned at the first location and optically connected with an optical fiber which will provide the out-going communication beam and an optical fiber which will receive the in-coming communication beam. At the second location there will then be a second base on which are mounted a transmitter, a beacon beam generating laser diode, a receiver, a camera and an adjuster with or without an associated computer. Similar to the first base, the second base can be connected with optical fibers which will provide the out-going communication beam and receive the in-coming communication beam. The two-way communication link can thus be established between the first location and the second location.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4A is a representation of the components of a communication beam as it is directed from a transmitter as would be seen in cross-section along the line 4A—4A in FIG. 3;

FIG. 4B is a representation of the overlap of different beams transmitted from the same transmitter as would be seen in cross-section along the line 4B—4B in FIG. 3;

FIG. 5 is a schematic drawing of a receiver used in the system of the present invention;

FIG. 6 is a schematic drawing of the optical components in a receiver of the present invention;

FIG. 7A is an end on view of a target in the optical components of a receiver in the system of the present invention with the beacon beam off center; and FIG. 7B is an end on view of a target in the optical components of a receiver in the system of the present invention with the beacon beam on center.

DESCRIPTION OF THE PREFERRED EMBODIMENT

Figure 1:
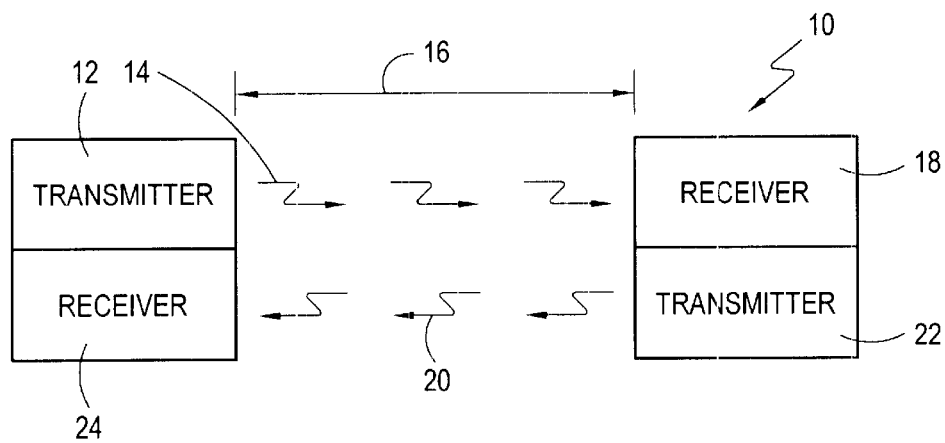
FIG. 1 is a schematic drawing of a system in accordance with the present invention.

Referring initially to FIG. 1, a system for establishing a communication link over a terrestrial free-space is shown and generally designated 10. As shown, the system 10 includes a transmitter 12, which is positioned at a first location on the surface of the earth (not shown). From this first location, the transmitter 12 directs a common beam 14 through a transit distance 16 in the earth's atmosphere to a receiver 18 which is positioned at a second location on the earth's surface. As will be better appreciated from the discussion below, the common beam 14 actually includes a beacon beam having one wavelength and at least one communication beam having another different wavelength. With these components, a one-way communication system can be established. The present invention, however, is also useful for two-way communications by providing for a common beam 20 which can be directed from a transmitter 22 at the second location to a receiver 24 at the first location. Again, as will be appreciated by subsequent disclosure, the common beam 20 will actually include a beacon beam and at least one communication beam.

Figure 2:
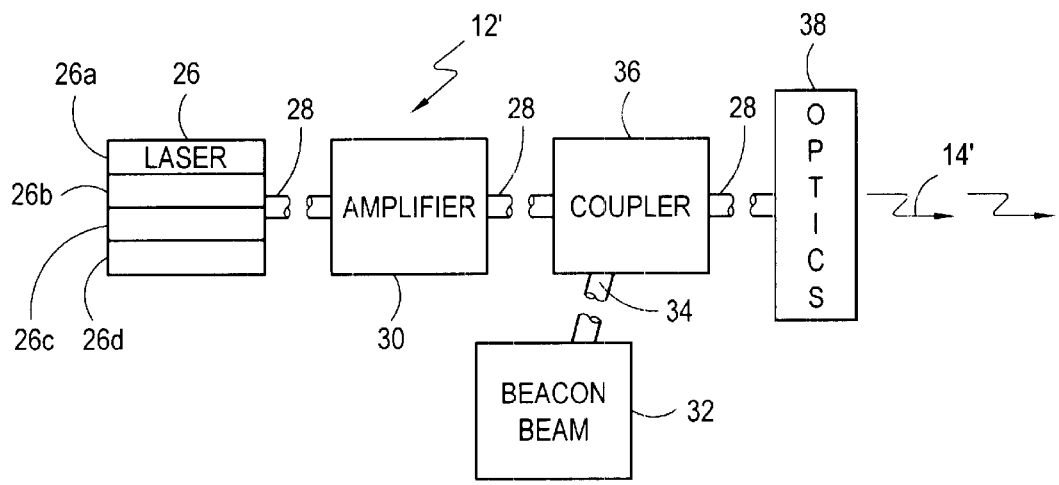
FIG. 2 is a schematic drawing of one embodiment for a transmitter in the system of the present invention.

In FIG. 2, one embodiment for the transmitter 12 of the present invention is shown and generally designated 12'. Specifically, for the transmitter 12', a laser source 26 is provided which will generate a laser beam that is modulated with a high speed communication signal to create a communication beam. Typically the power generated by the laser source 26 for the communication beam is low and is only on the order of approximately one to five milliwatts. In another aspect, it is preferable that the communication beams which are generated by the laser source 26 have a wavelength that is in a range of from about fifteen hundred nanometers to about sixteen hundred nanometers (1500 nm–1600 nm). Further, as indicated by FIG. 2 it is possible for the laser source 26 to effectively include several different laser sources 26a–d. With multiple laser sources 26a–d, it is then possible to respectively generate as many communication beams. Each communication beam so generated, however, will have a different wavelength (e.g. 1548 nm, 1549 nm, 1550 nm and 1551 nm). As further indicated in FIG. 2, all of the communication beams that are respectively generated by laser sources 26a–d, with their respective communications signals, are impressed onto a single optical fiber 28 in a manner well known in the pertinent art. For reasons set forth above, the optical fiber 28 that is used for the system 10 of the present invention is preferably a single mode fiber, and will have a core which is about ten microns in diameter.

FIG. 2 also shows that the transmitter 12' includes an amplifier 30. Recall, the preferred wavelength for the laser communication beams generated by the laser source 26 is around 1550 nm. It then happens that the amplifier 30 is preferably an Erbium doped fiber amplifier which is particularly efficient for amplifying this wavelength of light from the laser source 26. Specifically, when using an Erbium doped fiber amplifier 30 it is possible to amplify communication beams leaving the laser source 26 from the 1–5 mW of power as the light leaves the laser source 26 to around 1–10 watts of power after it has passed through the amplifier 30. As further shown in FIG. 2, the transmitter 12' includes a beacon beam generator 32 which preferably includes a semiconductor diode laser that will generate a beacon beam. Preferably, the beacon beam will have a wavelength in the near infrared that is in the range of from approximately six hundred and twenty nm to around nine hundred and ninety nm (620 nm–990 nm). As shown for the embodiment of the transmitter 12' in FIG. 2, this beacon beam is then transmitted over an optical fiber 34 to a coupler 36 where it is joined with the communication beam coming from the laser source 26 and amplifier 30.

Once the communication beam and the beacon beam have been combined into a common beam 14' in the transmitter 12', the common beam 14' is passed through the transmitter optics 38. In the transmitter optics 38 the common beam 14' is collimated before it is sent over a terrestrial free-space transit distance 16 to the receiver 18.

For another embodiment of the transmitter 12, many of the same components disclosed above in the context of transmitter 12' are again incorporated. Specifically, for the transmitter 12" there will be a laser source 26, an amplifier 30 and a beacon beam generator 32. This time, however, instead of using a coupler 36, the beacon beam is fed directly into the transmitter optics 38". Accordingly, the beacon beam and the communication beam are not combined into a common beam 14 before being transmitted from the transmitter 12" to the receiver 18. Instead, after the beacon beam and the communication beams are collimated by the transmitter optics 38" both of these beams are directed along substantially parallel paths toward the receiver 18. The consequence of this will, perhaps, be best appreciated by reference to FIG. 4A and FIG. 4B.

Figure 3:
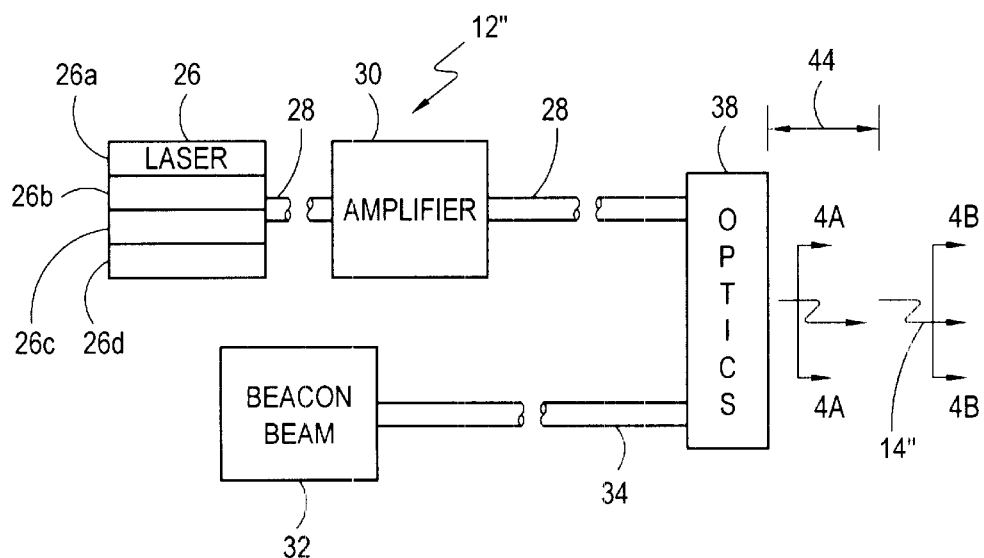
FIG. 3 is a schematic drawing of another embodiment for a transmitter in the system of the present invention.

In FIG. 4A, the cross section of a beacon beam 40 is shown in relation to the cross sections of various communication beams 42a–d as they would appear immediately after leaving the transmitter 12" on substantially parallel paths. In this preferred embodiment, the communication laser beam is split into four parallel beams by optics 38 for the purpose of reducing signal fluctuations caused by the atmosphere. After the beacon beam 40 and communication beams 42a–d have traveled beyond an overlap distance 44 (see FIG. 3), the beams begin to merge together in a manner well known in the pertinent art. In FIG. 4B it will be seen that this merger of the beams 40 and 42 results in an overlap region 46. Within this overlap region 46 for the common beam 14" there will be a portion of each of the beams 40 and 42. Thus, the resultant common beam 14" transmitted by the transmitter 12", like the common beam 14' transmitted by the transmitter 12', will include both a beacon beam 40 and at least one communication beam 42.

In FIG. 5 it will be seen that the receiver 18 of the system 10 includes a spherical mirror 48 which collects the common beam 14 that is being transmitted by the transmitter 12. From the spherical mirror 48 the beam 14 is directed onto a spherical lens/flat mirror 50 from which the beam 14 is focused toward an aligner 52. The purpose of the aligner 52 for the system 10 of the present invention is to accurately direct the beacon beam 40 in a manner which will cause the common beam 14 to be incident on an optical target. Accordingly, the common beam 14 (with the communication beam 42) can then be further transmitted from the optical target through other optical devices such as the optical fiber 54. How this is accomplished will be best appreciated by referencing FIGS. 6, 7A and 7B.

As seen in FIG. 6 an incoming common beam 14, after being focused by the spherical lens/flat mirror 50 will be re-collimated by a lens 56. The re-collimated common beam 14 is then passed through a filter, 58 which blocks background light from further transit with the common beam 14, and it is next focused by a lens 60 onto an optical target 62. According to the present invention, the optical target can be an optical detector or a multi-mode fiber having a diameter of around fifty or sixty two and a half microns (50 $\mu$m or 62.5 $\mu$m). The optical target 62 could just as well be a single mode optical fiber having a diameter or around ten microns. In any event, as the common beam 14 is incident on the target 62, scattered light 64 will be reflected from the target 62. As shown in FIG. 6, this scattered light 64 will be directed back through the lens 60, and back through the filter 58, to a turning mirror/prism 66 where it will be directed off axis toward another turning mirror/prism 68. From the turning mirror/prism 68, the scattered light will then be focused by a lens 70 into a camera 72. For the purposes of the present invention, the camera 72 is preferably of a type compatible with the wavelength of the beacon beam 40, such as a silicon based CCD camera or a silicon on CMOS camera.

Referring now to FIG. 7A, it is to be appreciated that FIG. 7A is a view of the target 62 as seen by camera 72 with the scattered light 64. Specifically, in this view, the camera 72 will see the focal point 74 of the beacon beam 40 as well as a representation of the target 62. Shown in FIG. 7A, for example, is an optical target 62 which is an end of the optical fiber 54. For this example, the optical fiber 54 will have a cladding 76 and a core 78. As is well known, in order for the optical fiber 54 to further transmit the common beam 14 (with the communication beam(s) 42) it is necessary for the common beam 14 to be focused onto the core 78 of optical fiber 54. In FIG. 7A, however, it is seen that the focal point 74 for the beacon beam 40 is located at a displacement distance 80 from the center of core 78. Consequently, in order for the system 10 to be able to complete the communication link between optical fiber 28 at the transmitter 12, and optical fiber 54 at the receiver 18, it is necessary to center the focal point 74 onto the core 78 as shown in FIG. 7B.

Movement of the focal point 74 of beacon beam 40 onto the core 78 (and, therefore, the movement of communication beam 42 onto the core 78) can be accomplished in either of two ways for the present invention. First, this movement can be accomplished manually by physically manipulating an adjuster 82. Such manipulation can be made in any of several ways, all well known in the pertinent art, to move the target 62 into alignment with the common beam 14. Recall, the common beam 14 includes both the beacon beam 40 which is detected by the camera 72 and the communication beam 42 which is carrying the signal data to be transmitted by the system 10. The second way by which the focal point 74 can be moved into alignment on the core 78 of optical fiber 54 is by operation of a computer 84. In this latter mode, the computer 84 is electronically connected via a line 86 with the camera 72, and via a line 84 with the adjuster 82. With these connections, the computer 84 is able to receive information from the camera 72 and generate an error signal which is indicative of the displacement distance 80. Then, through well known computer techniques, the computer 84 can send signals to the adjuster 82 which will cause the adjuster 82 to move the target 62 until the error signal (and the displacement distance 80) is zero. Alternatively, using techniques well known in the pertinent art, the entire optical assembly (i.e. lenses 56, 60, and filter 58) can be moved in concert to align the optical beam with the target 62. In this condition, the focal point 74 of beacon beam 40 will be directed onto the core 78 of optical fiber 54 and the communication beam 42 will be effectively transmitted over the system 10 from optical fiber 28 to optical fiber 54.

While the particular Alignment System For Laser Communication Beam as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for directing a communication beam through a transit distance onto a target optical fiber over a terrestrial free-space optical data link, wherein the communication beam emanates from a transmit optical fiber and the system comprises:
   a transmitter optically connected with the transmit optical fiber, the transmitter including an optical element for directing the communication beam along a path from the transmit optical fiber toward the target optical fiber;
   a means for generating a beacon beam optically connected with the optical element of the transmitter for directing the beacon beam along the path with the communication beam as a combined common beam;
   a receiver positioned at the transit distance from the transmitter for collecting the common beam and for focusing the common beam to a focal point;
   a camera for receiving scattered light from the focal point to determine a displacement distance between the focal point of the common beam and the target optical fiber; and
   an alignment means for reducing the displacement distance to a null to make the focal point of the common beam incident on the target optical fiber.

2. A system as recited in claim 1 wherein the transmitter comprises:
   a first transmitter for transmitting the communication beam along a first path; and
   a second transmitter for transmitting the beacon beam along a second path, the second path being substantially parallel to the first path to establish an overlap region beyond an overlap distance from the transmitter wherein a portion of the communication beam and a portion of the beacon beam travel on the path as the common beam.

3. A system as recited in claim 1 further comprising means for coupling the beacon beam with the communication beam for emanation from the a transmit optical fiber as the common beam.

4. A system as recited in claim 1 further comprising:
   a first base with a transmitter, a beacon beam generating means, a receiver, a camera and an alignment means mounted thereon; and
   a second base with a transmitter, a beacon beam generating means, a receiver, a camera and an alignment means mounted thereon, the second base being positioned at the transit distance from the first base.

5. A system as recited in claim 1 wherein the alignment means further comprises:
   an adjuster for moving the focal point of the common beam relative to the target to position the focal point of the common beam on the target optical fiber; and
   a computer for generating an error signal indicative of the displacement difference between the focal point of the common beam and the target optical fiber, and wherein the computer includes electronic means for activating the adjuster to reduce the error signal to a null and to thereafter substantially maintain the error signal at the null.

6. A system as recited in claim 1 wherein the optical element collimates the communication beam and the beacon beam.

7. A system as recited in claim 1 wherein the communication beam has a wavelength in the range of one thousand two hundred to one thousand eight hundred nanometers (1200–1800 nm).

8. A system as recited in claim 7 wherein the communication beam has a wavelength in the intermediate infrared range of approximately one thousand five hundred and fifty nanometers (1550 nm) and wherein the communication beam is amplified by an erbium doped optical amplifier.

9. A system as recited in claim 1 wherein the means for generating the beacon beam is a laser diode.

10. A system as recited in claim 1 wherein the beacon beam has a wavelength in the near infrared and is of less than approximately one thousand one hundred nanometers (1100 nm).

11. A system as recited in claim 1 wherein the transmit optical fiber is a single mode optical fiber.

12. A system as recited in claim 1 wherein the target optical fiber is a core of a single mode optical fiber, and the core has a diameter of approximately ten microns (10 $\mu$m).

13. A system as recited in claim 1 wherein the target optical fiber is a multi-mode fiber having a core diameter in a range of approximately thirty to seventy microns (30–70 μm).

14. A system as recited in claim 1 wherein said camera is a charged-couple-device camera.

15. A terrestrial free-space optical data link for connecting a first transceiver at a first location with a second transceiver at a second location, wherein the first transceiver is separated from the second transceiver by a transit distance and wherein each of the transceivers in the link comprises:

a transmit optical fiber carrying a communication beam having a first wavelength, the communication beam emanating from the transmit optical fiber;

a transmitter optically connected with the optical fiber, the transmitter including an optical element for directing the communication beam along a path toward the other transceiver;

a means for generating a beacon beam having a second wavelength, the beacon beam generating means being optically connected with the optical element of the transmitter for directing the beacon beam along the path together with the communication beam as a combined common beam;

a receiver for collecting the common beam from the other transceiver and for focusing the common beam from the other transceiver to a focal point;

a target optical fiber mounted on the receiver;

a camera for receiving scattered light from the focal point to determine a displacement distance between the focal point of the common beam from the other transceiver and the target optical fiber; and an alignment means for reducing the displacement distance to a null to make the focal point of the common beam from the other transceiver incident on the target optical fiber.

16. A data link as recited in claim 15 further comprising:

a computer for generating an error signal indicative of the displacement distance between the focal point of the common beam received from the other transceiver and the target optical fiber; and electronic means in the computer connected with the alignment means for activating the alignment means to reduce the error signal to a null and to thereafter maintain the error signal at the null.

17. A system as recited in claim 15 wherein the respective communication beams of the first and second transceivers has a wavelength in the intermediate infrared range of approximately one thousand five hundred and fifty nanometers (1550 nm), wherein the respective communication beam is amplified by an erbium doped optical amplifier, and further wherein the respective beacon beams of the first and second transceivers has a wavelength in the near infrared and is of less than approximately one thousand one hundred nanometers (1100 nm).

18. A method for directing a communication beam through a transit distance from a first location onto a target optical fiber at a second location over a terrestrial free-space optical data link, wherein the communication beam emanates from a transmit optical fiber and the method comprises the steps of:

using an optical element at the first location for directing the communication beam along a path toward the target;

generating a beacon beam optically connected with the optical element of the transmitter at the first location;

directing the beacon beam along the path with the communication beam as a combined common beam;

collecting the common beam at the second location;

focusing the common beam to a focal point at the second location;

providing a camera at the second location for receiving scattered light from the focal point to determine a displacement distance between the focal point of the common beam and the target optical fiber; and activating an alignment means for reducing the displacement distance to a null to make the focal point of the common beam incident on the target.

19. A method as recited in claim 18 further comprising the steps of:

generating an error signal with a computer, the error signal being indicative of the displacement distance between the focal point and the target optical fiber; and activating the alignment means to reduce the error signal to a null.

20. A method as recited in claim 18 wherein the communication beam has a wavelength in the intermediate infrared of approximately one thousand five hundred and fifty nanometers (1550 nm) and the beacon beam has a wavelength in the near infrared and is of less than approximately one thousand one hundred nanometers (1100 nm).

* * * * *

UNITED STATES PATENT AND TRADEMARK OFFICE
CERTIFICATE OF CORRECTION

PATENT NO. : 6,498,668 B1
DATED : December 24, 2002
INVENTOR(S) : Eric Korevaar

It is certified that error appears in the above-identified patent and that said Letters Patent is hereby corrected as shown below:

Column 8,
Line 24, delete "a"

Signed and Sealed this

Twenty-second Day of April, 2003

JAMES E. ROGAN
*Director of the United States Patent and Trademark Office*